RADIO FREQUENCY DISCRIMINATOR CIRCUIT

Filed Nov. 20, 1961 2 Sheets-Sheet 1

INVENTOR.
William A. Paulson
BY Wolfe Hubbard Voit & Osann
ATTORNEYS

March 31, 1964 W. A. PAULSON 3,127,563
RADIO FREQUENCY DISCRIMINATOR CIRCUIT
Filed Nov. 20, 1961 2 Sheets-Sheet 2
Fig. 2b. (Strong Signal From Another Channel)
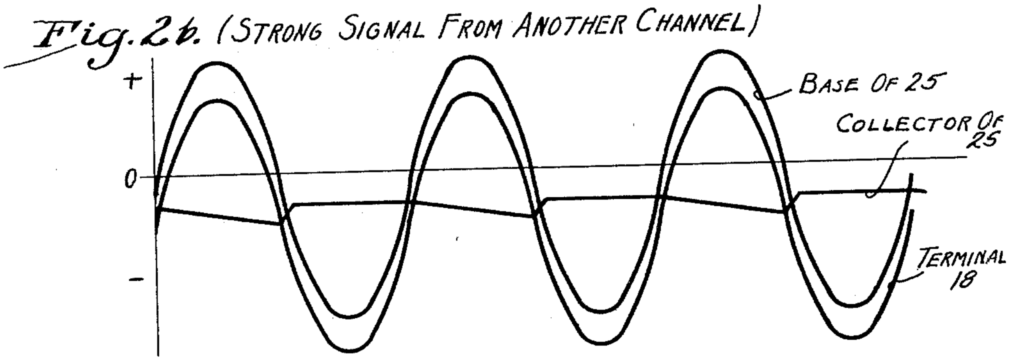
Fig. 2c. (Very Strong Signal Slightly Off Channel)
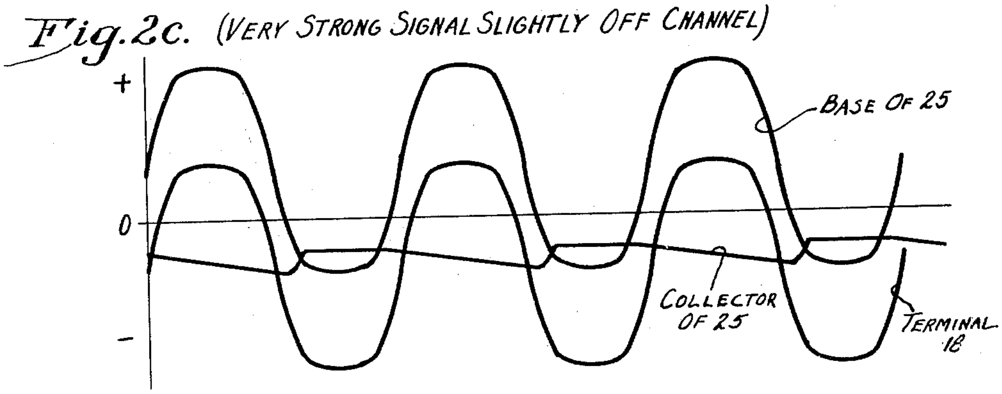
Fig. 2d. (Signal On Channel)
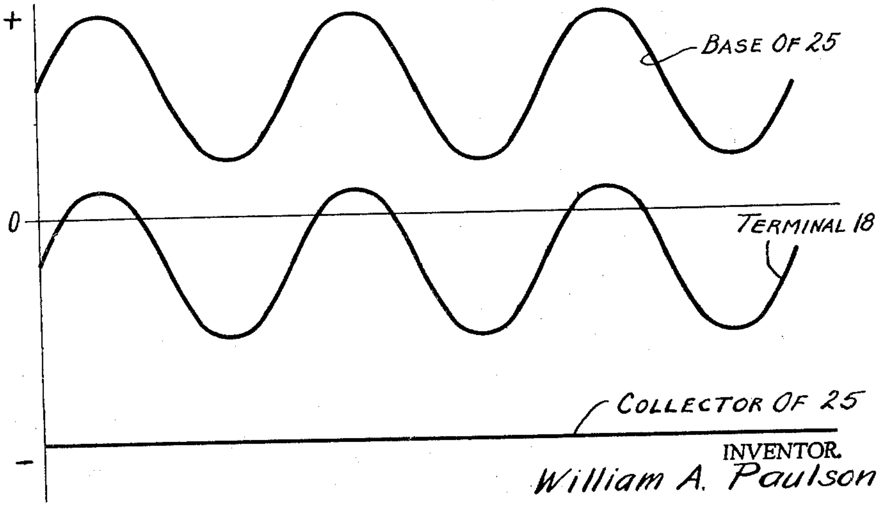
INVENTOR.
William A. Paulson
BY Wolfe Hubbard Voit & Osann
ATTORNEYS United States Patent Office 3,127,563
Patented Mar. 31, 1964

3,127,563
RADIO FREQUENCY DISCRIMINATOR CIRCUIT

William A. Paulson, Rockford, Ill., assignor to Barber-Colman Company, Rockford, Ill., a corporation of Illinois Filed Nov. 20, 1961, Ser. No. 153,524
4 Claims. (Cl. 325—466)

This invention relates to frequency selective radio receiving apparatus.

The heart of many radio controlled equipments, such as garage door openers, is the frequency selective detector or discriminator circuit employed to respond to a desired frequency or very narrow band of frequencies of signals received from a controlling transmitter and which rejects off-frequency signals no matter how large their amplitude. Such off-frequency signals may be those generated by similar transmitters tuned to a different channel for operation of neighboring radio controlled equipment or any various communication or noise signals. Various circuits have been known which provide this desired characteristic at the expense of one or more of such important factors as low initial cost, low operating cost, simplicity, low maintenance, stability, and long life.

It is the primary object of the present invention to provide a more economical and reliable frequency discriminator operable over a range of adverse conditions than theretofore known.

It is a further object of the present invention to provide an exceptionally dependable and simple frequency selective detector capable of rejecting strong signals near the desired frequency.

It is a further object to provide a reliable receiver having an improved detector readily adjustable to respond only to a signal of selected frequency.

It is another object of the invention to provide a radio-controlled frequency selective actuating circuit having a sharply defined and stable operating characteristic.

It is a further object of the invention to provide a radio control system for garage door operation advantageously employing amplifier elements as part of the frequency selective circuitry.

Figure 1:
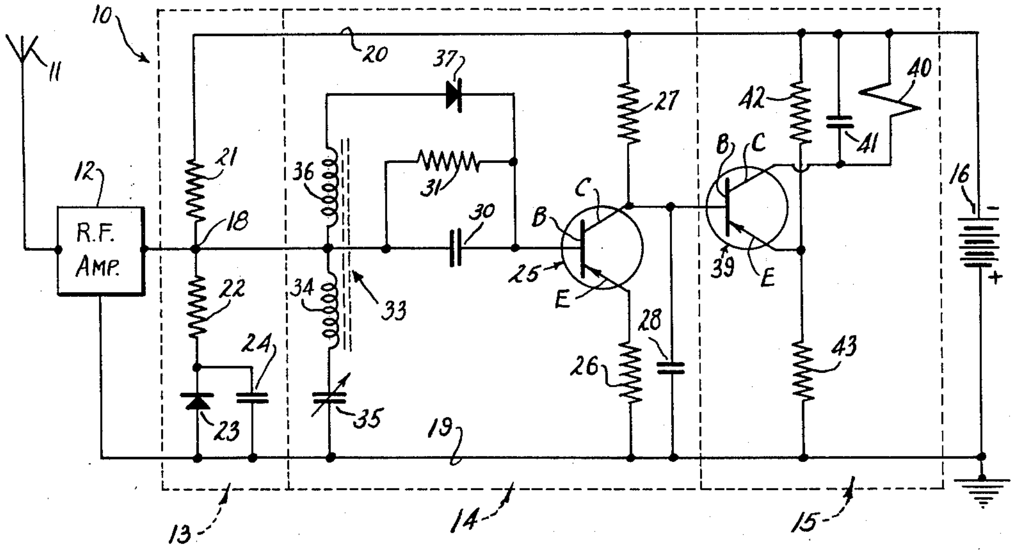

Various objects and advantages will become apparent as the following detailed description proceeds taken together with the accompanying drawings in which:

FIGURE 1 is a circuit diagram of a frequency selective control circuit embodying the invention and FIGS. 2*a*, 2*b*, 2*c*, and 2*d* are sets of curves illustrating electrical characteristics of the circuit of FIGURE 1 for different received signal conditions.

While the invention is described in connection with the preferred embodiment thereof it will be understood that the invention is not to be limited to the specification embodiment shown and described, and that the appended claims are intended to cover the various alternative and equivalent constructions within the spirit and scope of the invention.

Looking now to FIGURE 1, a radio controlled actuating circuit or receiver 10 is illustrated comprising a receiving antenna 11, a radio frequency amplifier 12, a bias circuit 13, a detector circuit 14, a direct current amplifier or relay driver 15, and a direct current source 16. The antenna 11 and radio frequency amplifier 12 are conventionally designed to receive and amplify a relatively broad band of frequencies including the particular frequency or channel selected for operation of a particular receiver and deserve no further description here. In a typical instance, for example, where garage door operating is the ultimate objective and where the operating frequency channels are established about two kilocycles apart over a 30 to 60 kilocycles range, conventional antennas and radio frequency amplifiers for such a range have been entirely satisfactory for such a pass band. The mobile transmitter (not shown) in such instances is usually mounted on an automobile. The receiver is typically stationed in a garage and tuned to the transmitter channel so as to open and close the door operator motor circuit in response to reception of signals of the selected frequency and of a sufficient amplitude indicating proximity of the mobile transmitter.

Alternating signals from the source represented in FIGURE 1 by antenna 11 and amplifier 12 are applied together with a bias voltage from the bias network 13 to input terminals 18 and 19 of the detector circuit 14. In the absence of a received signal the terminal 18 is maintained at a negative potential with respect to the ground or zero reference potential bus 19. Toward this end the positive terminal of source 16 is grounded and the negative terminal connected to bus 20. Voltage dividing resistors 21 and 22 are connected in series across the voltage source and are connected at terminal 18 to establish its potential. If desired (and particularly when a semi-conductor amplifying device is employed in the detector circuit), a semi-conductor diode 23 may be inserted between ground and one end of resistor 22. The diode characteristics vary with ambient temperature to compensaet for changes in characteristics of the amplifier device subject to the same ambient temperature. Capacitor 24 shunts the diode 23 to prevent undesired rectification of received signals.

A combined detector and amplifier device is shown in FIG. 1 as a semi-conductor transistor 25 having base, emitter and collector electrodes B, E, and C, respectively. The detector transistor is arranged in a base-input, common-emitter amplifying circuit biased for conduction in the absence of an on-channel signal. Transistors and vacuum tubes are both representative of rectifying amplifier devices or valves having respective common, control, and output electrodes and in which unidirectional current flow between the common and output electrodes is turned on or off when the control electrode potential exceeds a given control point or level. Transistors are preferred here, particularly because of their very low resistance when biased for conduction. As shown in FIG. 1, the detector transistor is polarized P-N-P with its emitter E connected to ground, suitably through a very low resistance 26. Its collector electrode C is connected to a negative bus 20 through a load resistor 27.

An integrator 28 taking the form of a collector capacitor 28 is connected between ground and the collector electrode to establish an average voltage level at the collector electrode C under varying alternating signal input conditions at the base B.

Specifically, so long as the transistor conducts during even a very small portion of the signal frequency cycle, the collector C potential desirably remains only a fraction of a volt more negative than ground. For example, conduction during less than 5% of the cycle has been found sufficient in practical embodiments. The collector potential increases to full-source voltage only after the transistor has been switched off for several cycles. Toward this end, a relatively high value for resistor 27 is selected. The charging time for the capacitor 28 through the resistor 27 is thus made very many times higher than the discharging time of the capacitor through the low value resistor 26 and the low emitter to collector resistance of the transistor 25 occurring when the transistor conducts. This discharge resistance approaches short circuit resistance if the amplifier device is a transistor.

The detector transistor 25 employed as the amplifier device is maintained conductive by application of the negative potential (i.e., negative with respect to ground)

from terminal 18 to the transistor base B. The input circuit is completed for off-channel alternating signals by a pass capacitor 30 between input terminal 18 and base B, the ground return being through the emitter, and emitter resistor 26 to complete the input signal circuit. Capacitor 30 has a value selected to present a relatively low impedance to signal current flow through the input circuit during the portion of each cycle when the base electrode B is negative with respect to the emitter E or ground. A resistor 31 shunting the capacitor 30 enables the D.C. bias of terminal 18 to be applied to the base B of transistor 25.

A shunt path for input signal current of the selected frequency is provided through the primary winding 34 of a transformer 33 and a variable capacitor 35 connected in series between terminals 18 and 19. This series circuit is tuned to resonate at the selected frequency corresponding to the controlling transmitter channel. Adjustment of the variable capacitor 35 provides a convenient means of tuning the receiver. The nonresonant impedance of the series circuit is much higher than that of the capacitor 30, and the resonant impedance of the series circuit very much lower than that of the capacitor 30.

The transformer secondary wniding 36 is connected between terminal 18 and through a rectifier 37 to the base B of detector transistor 25. Both windings are preferably on a ferrite core of the transformer 33 so that when the received signal is of the desired frequency, most of the signal current is shunted through the low impedance presented by the series circuit 34, 35 at resonance and a relatively strong signal is induced in the second winding 36.

The rectifier 37, suitably a semiconductor diode, is poled oppositely from the rectifying diode represented by the base B to emitter E junction of the detector transistor 25 to block flow at any instant in either direction through both rectifiers. Accordingly, the induced half wave secondary signal as rectified by the diode 37 charges the capacitor 30 which remains charged during the alternate half cycles to make less negative (or more positive) the direct current voltage bias level applied to the base B of transistor 25. A high enough value of resistor 31 is chosen so that the discharge time constant of the capacitor 30-resistor 31 combination is much longer than the half-cycle period at the lowest frequency received. When the voltage (i.e., the sum of the bias voltage and the instantaneous alternating voltage), on its base B is positive, the transistor 25 stops conducting.

While the collector resistor 27 may itself be considered as the load device responsive to current change or voltage across it when the transistor is switched off, the change in voltage across it is conveniently employed to control a further voltage amplifier or relay driver stage 15. To this end, as further shown in FIG. 1, the succeeding amplifier device 39 is conveniently a P-N-P transistor arranged in the base-input, common emitter amplifier configuration. The base B of the second transistor 39 is directly connected to the collector electrode C of the first transistor 25, and the collector C of the second transistor 39 is connected to the negative bus 20 through a load impedance 40 which in this case suitably takes the form of a motor relay coil 40 shunted by capacitor 41. The operating or control point for the second transistor 30 is established by a voltage dividing network in which resistor 42 is connected from the negative bus 20 to emitter electrode E and resistor 43 is connected from the emitter E to ground. With the emitter E of the second transistor thus at an established negative voltage with respect to ground (and positive with respect to the collector), the transistor 39 conducts when the control electrode B is made more negative than the emitter. The relay coil 40 is then energized. Various devices may be operated by the relay driver stage 15, the circuit controlled by relay coil 40 being suitably that of a motor or other device desirably remotely controlled by radio.

The operation of the actuating circuit for a range of signal conditions is illustrated in FIGS. 2*a*, 2*b*, 2*c* and 2*d*.

These represent, respectively, (*a*) no or very weak received signals, (*b*) an off-channel strong received signal, (*c*) a very slightly off-channel very strong signal, and (*d*) a strong on-channel signal. The signal is indicated in each figure in terms of potential with respect to ground as the zero reference (the ground also being the positive terminal of the source 16). The several curves for each figure are the potential at input terminal 18, the potential of base B of transistor 25 and the potential of collector electrode C of transistor 25. It will be appreciated that with the P-N-P polarity of transistor 25 and with ground potential very close to its emitter, current flows from the emitter E to the collector C and negative bias transistor 25 when base B is at a negative potential with respect to ground. The relationships of the curves of each figure are discussed in some detail in the following paragraphs for a fuller appreciation of the relationship of the system components and of the range of useful variations of apparatus incorporating the invention.

Figure 2A:
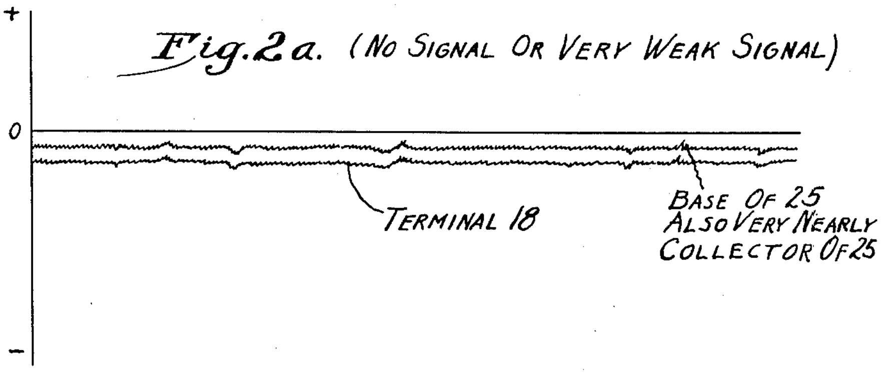

In the absence of a received signal, or in the presence of very weak signals as shown in FIG. 2*a*, the instantaneous voltage of input terminal 18 remains very close to the negative bias value set by the bias network 13. This is in the vicinity of one-half volt or somewhat less in the illustrated embodiment and with a 10 volt source 16. Due to signal current flow through resistor 31, the voltage level at base B of transistor 25 as indicated in FIG. 2*a* is somewhat less negative than at terminal 18. Since transistor 25 remains conductive, practically all of the source voltage drop appears across the load resistor 27. The transformer 33 plays no significant role in the absence of an alternating signal. Under these conditions, the slightly negative voltage at the collector C of detector transistor 25 holds the base B of the second transistor 39 at a positive potential with respect to its emitter. The second transistor does not conduct, and the actuator relay coil 40 is not energized.

Next, in the event of receipt of a strong but off-channel signal (as from a similar transmitter operating in an adjacent channel), an alternating signal is superimposed on the negatively biased terminal 18 as shown in FIG. 2*b*. The bias current and part of the signal current flows through the low impedance network represented by the capacitor 30 and resistor 31. The reactance of the capacitor 30 is low over the entire receiver band so that little of the signal current flows through the shunt path represented by transformer secondary winding 36 and diode 37. Only a small proportion of the signal current is shunted through the tuned series circuit represented by transformer primary winding 34 and capacitor 35 since the off-resonance impedance of the series circuit is high. Only a weak signal is induced in the secondary winding. As indicated in FIG. 2*b*, the average voltage at the transistor base is somewhat less negative than under the no-signal condition of FIG. 2*a*, this being due to the fact that a small part of the secondary voltage signal rectified by diode 37 appears across capacitor 30. The average value in this instance remains at a negative value. While the positive excursions of the base voltage indicated in FIG. 2*b* stop conduction for somewhat less than half of each cycle the potential of the collector C remains close to ground since capacitor 28 is but slowly charged through resistor 27 and quickly discharged through the transistor during its conductive period. The second transistor 39 remains non-conducting.

Referring now to FIG. 2*c*, a very stringent test occurs upon reception of a very strong signal (shown distorted by the clipping action of the radio amplifier) very near the receiver channel. Substantial portions of the signal current flow both through the pass network 30, 31 and through the tuned circuit to generate a signal in the secondary winding 36 of the transformer 33. The capacitor 30 is charged by the rectified secondary voltage to a level sufficient to overcome the negative bias imposed by the bias network 13 but without eliminating entirely the negative excursions of the alternating voltage at the base B of transistor 25.

With the transistor 25 non-conductive during most of the cycle, the integrating capacitor 28 is partially charged during each cycle. However, during the negative excursions when the transistor briefly conducts, the integrating capacitor 28 is quickly discharged. As a result, the collector voltage of transistor 25 remains close to the ground potential and the second transistor 39 remains turned off.

Turning now to FIG. 2*d*, when an on-channel signal is received the alternating voltage is superimposed on the negative bias level of input terminal 18 as in the case of the reception of an off-channel signal. The average value of the signal appearing at the base of the detector transistor 25 has a relatively high positive value and the negative-going dips in the signal voltage are still positive with respect to ground at the base of transistor 25. At resonance or near resonance, most of the received signal current flows through the series circuit 34, 35 in view of its very low impedance at resonance. For typical input impedances of the preceding radio amplifier stage, the voltage at terminal 18 may also be reduced by reason of the internal voltage drop accompanying the heavy current drain. It will also be noted in FIG. 2*d*, that the alternating component of the signal at the base has smaller amplitude than that of the off-resonance signal of FIG. 2*b*, even though the signals were of the same received amplitude at terminal 18.

The high positive displacement of the signal at the base of transistor 25 is due to rectification by diode 37 and storage by capacitor 30 of the strong signal induced in the second winding 36. Thus the same capacitor 30 which serves to pass the signal from input terminal 18 to the base of the detector transistor 25 for off-resonant conditions passes only smaller amplitude signals during on-resonant conditions and in addition serves as a filter capacitor to raise the direct current level of the rectified induced voltage at resonance and keep the detector transistor non-conductive.

Under these conditions as reflected in FIG. 2*d*, the detector transistor conducts over the entire cycle, and after several cycles the capacitor 27 reaches the charge level shown in the drawing. When the potential of the collector of detector transistor 25 is driven sufficiently negative the second transistor 39 conducts and the relay 40 is actuated.

It will be appreciated that while very weak on-channel signals will not result in a sufficient induced signal in secondary winding 36 to turn-off the transistor 25, the signal strength from a proper transmitter increases with proximity until the transistor 25 turns off. On the other hand, when broad-band noise is received, the off-resonant signal components are not diverted through the shunt path of series circuit 34, 35. As a result, the alternating signal amplitude at the base of transistor 25 due to high amplitude noise is itself high and unlikely to be biased sufficiently positive to cut off conduction completely by the resonant or on-channel components of the noise signal. Since only part-time conduction of transistor 25 is enough to keep its collector voltage low, noise signal operation of the relay 40 is inhibited.

While it is believed that those skilled in the art will find the foregoing description sufficiently complete, the following tabulation of values for a working embodiment of the arrangement previously described may be of further assistance to the reader in illustrating the time constants and operating levels selected for a particular equipment.

| | |
|---|---|
| Resistor 21 | 47,000 ohms. |
| Resistor 22 | 680 ohms. |
| Transistor 25 | Type 2N1274. |
| Resistor 26 | 8 ohms. |
| Resistor 27 | 10,000 ohms. |
| Capacitor 28 | 200 microfarads. |
| Capacitor 30 | .5 microfarad. |
| Resistor 31 | 3,300 ohms. |
| Capacitor 35 | 360–1,000 picofarads. |
| Transformer primary 34 | Approx. 20 millihenries. |
| Source 16 | 10 volts. |

The voltage and rectifier polarities in the preceeding description have been specified to be consistent with the choice of a P-N-P polarized transistor 25. It will be appreciated that the polarities are merely reversed for similar operation with an N-P-N transistor.

I claim:

1. A detector circuit comprising
a rectifying amplifier device having a common, input, and output electrodes,
a pair of input terminals for connection to a source of signals within a given range of input frequencies,
a series circuit comprising a first capacitor and first inductor connected between said terminals,
said series circuit being tuned to a desired frequency in said range,
input circuit means connecting said terminals to said common and input electrodes including in series therewith a second capacitor,
said second capacitor having a sufficiently high value to present a much lower reactance to frequencies within said range other than said desired frequency than does said series circuit,
a second inductor coupled to said first inductor for generation of an induced signal therein when a received signal of said desired frequency is applied across said tuned series circuit,
and a rectifying device connected in series with said second inductor across said second capacitor,
said rectifying device being poled for input circuit conduction in a direction opposite that of conduction between said input and common electrodes of said rectifying amplifier device
whereby the rectified induced signal voltage charges said second capacitor to change the direct current component of the signal applied between said input and common electrodes when the received signal is of said desired frequency.

2. A frequency selective detector comprising
a transistor having base, emitter, and collector electrodes,
an output circuit connected between said emitter and collector electrodes,
a pair of input terminals for connection to an alternating signal,
a series circuit comprising a first capacitor and first inductor connected between said terminals,
said series circuit being tuned to a selected signal frequency,
input circuit means connecting said terminals to said emitter and base electrodes including in series therewith a second capacitor shunted by a resistor,
said second capacitor having a sufficiently high value to present a lower reactance to frequencies other than said selected frequency than does said series circuit,
means for superimposing a bias potential between said input terminals for controlling current flow in said output circuit,
a second inductor coupled to said first inductor for generation of an induced signal therein when signal of said selected frequency is applied across said tuned series circuit,
and a rectifying diode,
said diode and second inductor being connected in series across said second capacitor,
said diode being poled for input circuit conduction in a direction opposite that of conduction between said base and emitter electrodes of said transistor
whereby the rectified induced signal voltage charges said second capacitor to overcome said bias potential said change the current flow in said output circuit.

3. A frequency selective detector comprising
a transistor having base, emitter, and collector electrodes,
a load resistor and a direct current source connected in series between said collector and emitter electrodes with one terminal of the load resistor connected to the collector electrode,
an integrating capacitor connected in series with said load resistor across said direct current source,
a series resonant circuit comprising a second capacitor and transformer primary winding tuned to a selected signal frequency,
means for connecting said series circuit across a source of received signals within a range including said selected frequency,
means for connecting said series circuit across a direct current control bias source,
one terminal of said series circuit being connected to said emitter electrode,
a third capacitor with a shunt resistor connecting the other terminal of said series circuit to said base electrode,
said third capacitor having a sufficiently high value to present a lower reactance to frequencies other than said selected frequency than does said series circuit,
a transformer secondary winding for generation of a secondary signal therein when a signal of said selected frequency is applied across said tuned series circuit,
and a rectifying diode,
said diode and secondary winding being connected in series across said third capacitor,
said diode being poled for input circuit conduction in a direction opposite that of conduction between said base and emitter electrodes of said transistor whereby the rectified secondary signal charges said third capacitor to overcome said bias,
and actuating means responsive to the amplitude of voltage across said load resistor.

4. A detector responsive only to a selected frequency signal comprising a rectifying amplifier device having a common, input, and output electrodes,
an amplifier output circuit comprising a load resistance and a direct current power source connected in series across said common and output electrodes,
an integrating capacitor also connected across said common and output electrodes having a charging time constant through said load resistor when said amplifier device is non-conductive much greater than the discharge time constant through the amplifier device when the amplifier device is conductive,
biasing means for applying a direct current bias to said control electrode to maintain the amplifier device normally conducting,
a pair of input terminals for connection to a signal source of a frequency range including the selected frequency,
a series circuit connected between said terminals comprising a first capacitor and first inductor tuned for series resonance at the selected frequency,
input circuit means connecting said terminals to said common and input electrodes including in series therewith a second capacitor,
said second capacitor of a value presenting a much lower reactance than does said series circuit to frequencies within said range other than said selected frequency,
a second inductor coupled to said first inductor for generation of an induced signal therein only when a resonant current flows from said signal source through said series circuit,
and a rectifying device connected in series with said second inductor across said second capacitor to charge said second capacitor and bias the input electrode for non-conduction of said amplifier device when signals of said selected frequency are applied to said input terminals.

References Cited in the file of this patent

UNITED STATES PATENTS 2,997,535 Brady et al. ------------ Aug. 22, 1961